No. 698,719. Patented Apr. 29, 1902.
G. E. LE CLAIR.
MACHINE FOR CUTTING WOOD FIBER.
Application filed Aug. 22, 1901.
(No Model.) 2 Sheets—Sheet 1.

ATTEST

INVENTOR
George E. Le Clair
By W. T. Fisher, Atty

No. 698,719. Patented Apr. 29, 1902.
G. E. LE CLAIR.
MACHINE FOR CUTTING WOOD FIBER.
(Application filed Aug. 22, 1901.)
(No Model.) 2 Sheets—Sheet 2.
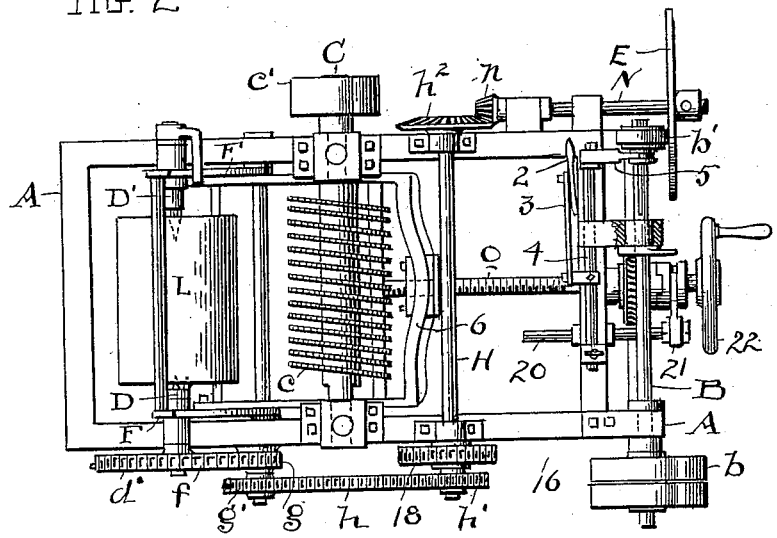
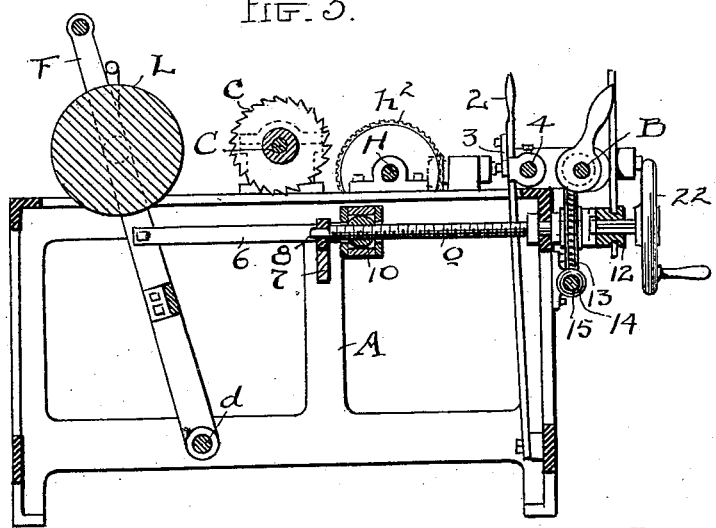
ATTEST
INVENTOR
George E. Le Clair
By W. F. Fisher ATTY

UNITED STATES PATENT OFFICE.

GEORGE E. LE CLAIR, OF ELYRIA, OHIO, ASSIGNOR TO JOHN W. VOGLESONG, OF ELYRIA, OHIO.

MACHINE FOR CUTTING WOOD FIBER.

SPECIFICATION forming part of Letters Patent No. 698,719, dated April 29, 1902.

Application filed August 22, 1901. Serial No. 72,888. (No model.)

*To all whom it may concern:*

Be it known that I, GEORGE E. LE CLAIR, a citizen of the United States, residing at Elyria, in the county of Lorain and State of Ohio, have invented certain new and useful Improvements in Machines for Cutting Wood Fiber; and I do declare that the following is a full, clear, and exact description of the invention, which will enable others skilled in the art to which it appertains to make and use the same.

My invention has reference to machines for cutting wood fiber, the same being constructed and operating substantially as shown and described.

Figure 1:
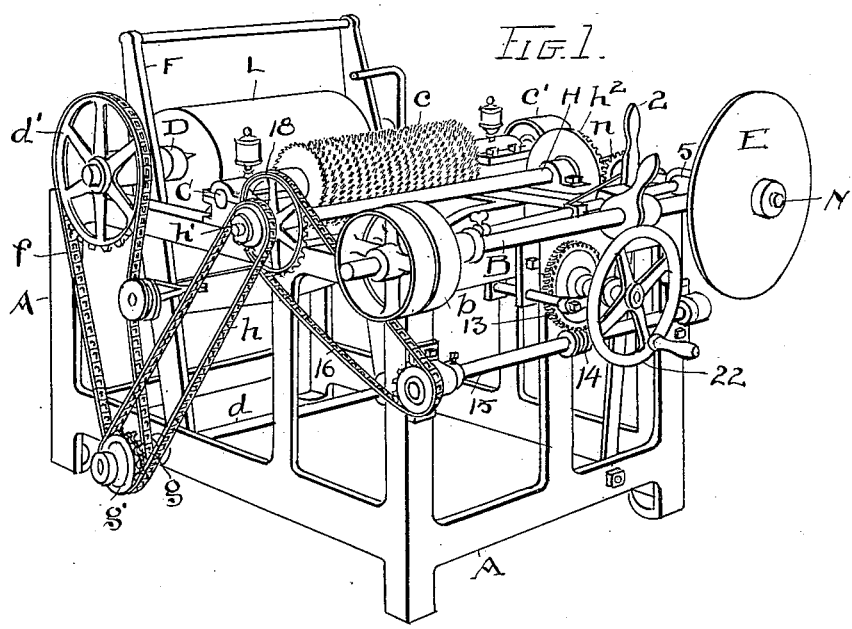
Figure 4:
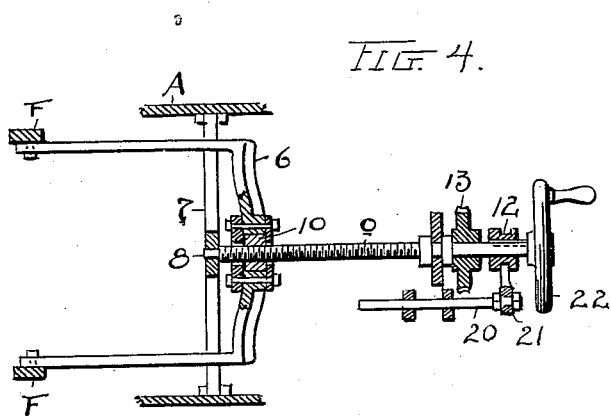

In the accompanying drawings, Figure 1 is a perspective elevation of the machine complete and equipped as in operation. Fig. 2 is a plan view of the machine. Fig. 3 is a vertical central sectional elevation thereof; and Fig. 4, Sheet 1, is a plan view in section of a portion of the adjusting mechanism as hereinafter fully described.

This machine belongs to the class or kind in which the saws or cutters are supported on a shaft with fixed bearings instead of being adjustable, and the log of wood is adapted to be moved toward the saws by automatically-operated feed mechanism which is timed to feed according to the rate at which the log is reduced, thus keeping the log always in a right cutting relation with the saws, while at the same time it is being automatically rotated.

To these several ends the invention comprises a suitable frame A, a power-driven shaft B, a cutter-carrying shaft C, log-supporting spindles D and D', and operating mechanism connecting the parts B, C, and D, as hereinafter fully described.

Power is communicated to shaft C, carrying a gang of cutters or saws $c$, by belt from the engine or other source of power running on pulley $c'$, so that the power driving shaft C and its saws is wholly independent of the other running mechanism.

The saws or cutters $c$ are disk-shaped, with saw-shaped teeth on their periphery, and the said saws are set upon the shaft C at an inclination or obliquely to a vertical plane, so that in operation they will not only have a direct forward cut into the log, as a crosscut-saw usually has, but that at the same time they will have a lateral to-and-fro play on the surface of the log which will traverse the cut back and forth from side to side of the next adjacent saws. Broadly, this is not new, and I do not so claim; but there is novelty in the operation of saws in this way in conjunction with the associated mechanism for controlling the log, as we shall see.

The log L has its spindles D D' supported in a frame F, pivoted at its bottom on shaft $d$, which extends through the bottom and sides of the main frame and comes within the sides of the main frame, and said pivoted frame is of such strength that it will support the log and the immediate operating mechanism therefor and hold the log firmly up to the saws. The near spindle D has a comparatively large sprocket-wheel $d'$ fixed on its outer end, and a sprocket-chain $f$ runs over this wheel and a pinion $g$ below on shaft $d$. Another sprocket-wheel $g'$ is on shaft $d$ outside pinion $g$, and chain $h$ runs from this wheel to pinion $h'$ above on counter-shaft H. This, it will be understood, is in the line of power-transmitting mechanism to roll or log L to rotate the same in front of the saws.

Graduated time rotation is imparted to shaft H by a line of mechanism proceeding from shaft B. This shaft has a pulley $b$ and an idler by its side, as here shown, and is driven from any available power, as a line-shaft or other source. At its opposite end a friction-wheel $b'$ on shaft B engages the face of disk E, and said wheel is splined on shaft B, so as to be movable toward or from the center of said disk to increase or decrease the speed of the disk, according as greater or less speed of rotation of log L is wanted. Shaft N carries disk E and has a bevel-pinion $n$ meshing with bevel-gear $h^2$ on shaft H, and this completes the chain of power connections from shaft B to log-spindle D and sprocket-wheel $d'$ thereon.

Friction-wheel $b'$, which engages the friction-disk and times the rotation of log L, is carried back and forth on said shaft by lever 2, pivoted in the lower portion of frame A and link 3, connected with a sliding rod 4, having arm 5 at one end engaged with the hub of wheel $b'$. The lever 2 is operated by hand, as here shown. The rotation of log L to the cutters is determined by certain mechanism affecting only pivoted frame F. This mechanism comprises a yoke 6, pivoted on said frame about midway its elevation and extending at its front across connecting-bar 7 of the main frame. In the middle and front of the yoke I form a suitable recess for a loose nut 10, through which runs a yoke-screw or screw-shaft $o$, swiveled or loosely supported at its point 8 in or upon cross-piece 7 of the main frame and having its opposite end also supported in the main frame. At its outer end the said screw has a clutch 12, splined thereon and adapted to lock upon gear-wheel 13, loose on screw O and driven by worm 14 on cross-shaft 15 beneath. The shaft 15 is in turn driven by sprocket-chain 16 from large wheel 18 on shaft H, so that the back-and-forth movement of log-frame F is at last determined by mechanism connected with shaft H, as is also the mechanism for rotating the log.

By loosely supporting nut 10 in yoke 6 I accommodate the mechanism to the changed position it assumes in its different adjusted positions, while the nut itself is held in its recess from turning.

In the operation of the machine as thus described the saws of course travel rapidly and by reason of their inclined setting have a vibratory action across the face of the log, while at the same time they have the direct cut as well. This gives them a raking action on the log and produces a fibrous product rather than a pulp with no length of fiber. Then also the log is held to a gradual and controlled rotation, while at the same time it is fed to the saws at a rate fixed by the mechanism controlling the pivoted frame which carries the log. This frame is wholly independent of the main frame except at its pivot on shaft $d$, which gives a free and independent movement to said frame through the screw at its front, and this is operated by hand or power, as may be best at the time. The hand operation is especially adapted to setting the relation of the parts when cutting is to begin and for running the frame back when a log has been exhausted and another is to be put into the machine. Then the machine is stopped and hand-operation is used to make the change.

Hand rotation of screw-shaft O occurs generally in setting the log to the saws at the beginning and in running the log-frame back when the log has been used up. Otherwise the feed of the log is mechanical through shaft 15, worm 14, and wheel 13. Clutch 12 is splined on shaft O and is disengaged automatically by frame-yoke $b$ coming back and striking push rod or bar 20, which has an arm 21 engaging clutch 12. Thereupon hand-wheel 22 on the outer end of shaft O is free to be rotated by hand, and it can be kept or made free by simply keeping clutch 12 out of engagement.

What I claim is—

1. In wood-fiber-cutting machines, a gang of saws and a shaft with fixed bearings supporting the saws, in combination with a log-supporting frame pivoted at its bottom in the main frame, and mechanism engaging said log-supporting frame and adapted to move it back and forth, said mechanism comprising a yoke pivoted on said log-supporting frame and a rotatable threaded shaft in fixed bearings operatively engaging said yoke, substantially as described.

2. The main frame and the saws supported therein, in combination with the pivoted log-frame and the spindles for the log, a yoke pivoted on said log-frame and an operating-shaft running through a nut fixed loosely in said frame, said shaft being rotatably supported at its ends, substantially as described.

3. The main frame and the set of saws, in combination with the pivoted log-frame, a yoke pivoted on said log-frame and a screw engaged in said yoke to carry the log-frame toward and from the saws, power mechanism to rotate said screw and a clutch to engage and disengage said mechanism, substantially as described.

4. The main frame and the series of saws thereon, in combination with the pivoted log-frame, a yoke pivoted on said frame about its middle and means connected therewith to adjust the log-frame back and forth, log-supporting spindles in the log-frame above the main frame, power-driven mechanism connected with one of said spindles to rotate the log and means to graduate the speed of said mechanism, substantially as described.

5. The pivoted log-supporting frame and the yoke connected therewith, a screw-shaft operatively engaged in said frame to feed the log, a clutch controlling the operation of said shaft, and means to disengage the clutch arranged to be actuated by said yoke, substantially as described.

6. In a wood-fiber-cutting machine, a set of saws, a pivoted log-carrying frame and a yoke connected therewith, in combination with a screw-shaft engaged in said yoke, power mechanism for rotating the shaft comprising a clutch splined on said shaft, push mechanism adapted to be engaged by said yoke and connected with said clutch to disengage the same, and a handle on said shaft to rotate the same for setting the said log-frame, substantially as described.

Witness my hand to the foregoing specification this 21st day of May, 1901.

GEORGE E. LE CLAIR.

Witnesses:
R. B. MOSER,
H. E. MUDRA.